(12) United States Patent
Miller et al.

(10) Patent No.: US 7,658,903 B2
(45) Date of Patent: Feb. 9, 2010

(54) HIGH PURITY NUCLEAR GRAPHITE

(75) Inventors: Douglas J. Miller, North Olmsted, OH (US); David R. Ball, Bay Village, OH (US)

(73) Assignee: GrafTech International Holdings Inc., Parma, OH (US)

(*) Notice: Subject to any disclaimer, the term of this patent is extended or adjusted under 35 U.S.C. 154(b) by 171 days.

(21) Appl. No.: 11/531,078

(22) Filed: Sep. 12, 2006

(65) Prior Publication Data
US 2009/0324485 A1 Dec. 31, 2009

(51) Int. Cl.
*C01B 31/04* (2006.01)

(52) U.S. Cl. ...................... 423/448; 264/29.1

(58) Field of Classification Search ........... 423/448; 264/29.1, 29.2, 29.3, 29.4, 29.5, 29.6, 29.7
See application file for complete search history.

(56) References Cited

U.S. PATENT DOCUMENTS

| | | | | |
|---|---|---|---|---|
| 4,076,775 A * | 2/1978 | Hackstein et al. | ............. | 264/0.5 |
| 4,998,709 A * | 3/1991 | Griffin et al. | ............... | 264/29.5 |
| 5,107,437 A | 4/1992 | Miller | ........................ | 364/476 |
| 5,118,287 A * | 6/1992 | Orac et al. | .................. | 432/106 |
| 6,395,220 B1 * | 5/2002 | Lewis et al. | ................. | 264/640 |
| 6,916,435 B2 * | 7/2005 | Kortovich et al. | ........... | 264/29.5 |
| 2008/0003167 A1 * | 1/2008 | Miller et al. | ............ | 423/445 R |

FOREIGN PATENT DOCUMENTS

GB 1098882 * 1/1968

OTHER PUBLICATIONS

Perry's Chemical Engineer's Handbook, p. 19-20 (One page) (Don W. Green, ed., 7th ed., McGraw-Hill 1997).*
Fitzer, et al., Recommended Terminology for the Description of Carbon as a Solid, Pure & Appl. Chem. 1995; 67(3): 473-506.*

* cited by examiner

*Primary Examiner*—Stanley S. Silverman
*Assistant Examiner*—Daniel C. McCracken
(74) *Attorney, Agent, or Firm*—Waddey & Patterson, P.C.; James R. Cartiglia

(57) ABSTRACT

A highly isotropic graphite useful for, inter alia, nuclear applications is disclosed, which has a ash content of less than 300 ppm and a boron equivalence of less than about 2 ppm without requiring a post graphitization purification step.

10 Claims, No Drawings

HIGH PURITY NUCLEAR GRAPHITE

BACKGROUND OF THE INVENTION

Technical Field

The present invention relates to a process for producing graphite from a needle coke substrate, and suitable for use in nuclear reactors. More particularly, the present invention relates to a method of creating highly isotropic graphite with a high degree of purity that does not require a post graphitization purification step, for use in nuclear applications. By "highly isotropic" is meant graphite having an isotropy ratio of less than about 1.5, which is defined as the ratio of CTE in two directions, specifically the against-grain CTE divided by the with-grain CTE. The invention also includes the novel high purity nuclear graphite so produced.

Graphite components ranging in dimensions from "rounds" (i.e., cylindrical billets) which are generally up to about 450 mm in diameter and about 900 mm in length, to rectangular blocks with volumes over 0.6 cubic meters, are used for fuel elements, moderator blocks and reflector blocks in the new generation of nuclear fission high temperature and very high temperature reactors. Essentially, these reactors are of two main designs, a prismatic design and a pebble bed design. For both of these nuclear reactor designs, the graphite can be used as a moderator to thermalize neutrons as well as for a neutron reflector. Yet furthermore, graphite used in nuclear reactors may also be used as structural fuel elements which can provide the network of channels for fuel and coolant gases surrounding the reactor.

The operation of a nuclear reactor produces substantial radiation which will contact the graphite articles used in constructing and maintaining the nuclear reactor. The graphite articles upon irradiation will often experience changes in physical and structural properties which can lead to a deficiency in performance of the graphite article, and in a worse case scenario, the failure of the graphite component. Moreover, impurities in reactor graphite can cause two undesirable effects. Some specific impurities absorb neutrons which are needed to sustain the nuclear chain reaction. Other elements as impurities can transmutate into hazardous isotopes which present a greater health hazard when the graphite is eventually removed from the reactor and processed as waste. Thus, conventional production processes for nuclear graphite materials require extensive purification steps to reduce or eliminate impurities, such as ash or boron.

The conventional production method for nuclear graphite materials involves the use of high CTE calcined coke with a medium grain characteristic, and either extrusion, uniaxial molding, vibrational molding, or isostatic molding to form the desired shape for the graphite article. However, the fundamental problem in achieving the required purity levels for graphite use in nuclear applications is that the high CTE calcined cokes employed are derived from inherently impure residues of either coal or crude oil refining. Quite typically, the impurity levels of high CTE calcined coke produced from coal tar includes substantial amounts of ash. Furthermore, most often the impurity levels of high CTE calcined coke produced from crude oil residue include a high concentration of ash from the original crude oil.

Generally, the prior art process of making nuclear graphite first includes the selection of the type of calcined coke, and the coke is subsequently broken into smaller particles and either crushed or milled prior to processing into graphite. Most often the crushed calcined coke is mixed with a type of binder, most generally a pitch. Pitch is a complex mixture of polynuclear aromatics derived from the thermal treatment of coal tar or petroleum tar. At ambient temperature, pitch appears solid but it is actually a liquid with an extremely slow flow rate. The pitch is mixed with the crushed coke to form a relatively solid product often known in the graphite industry as a green article.

At this point in the prior art process, the green article is shaped into the configuration which is desired for the final nuclear graphite product. Most commonly, extrusion is used to form the general shape of the green article prior to graphitization.

As is known in the art, extrusion is a process wherein the binder and coke mixture is pushed through a die to create an article with a fixed cross section. In forming graphite articles, the green article is heated so that it will flow more easily through the die, thus requiring less pressure and force to create the generic shape.

Additional means for shaping prior art green articles for forming nuclear graphite include both molding and pressing wherein pressure is typically supplied from either one or two directions to influence the green article into a desired configuration. Additionally, the mixture can be heated to facilitate greater ease in molding to the desired shape.

The next step in prior art processes of producing graphite usually entails baking the green article to remove volatile constituents, and more importantly, to convert the pitch binder into a solid carbonaceous material capable of holding and maintaining a rigid shape. During baking, the gases driven off from the green article often cause small channels and pores within the article providing for an extended and open porosity throughout the carbon body. As such, additional pitch is impregnated into the baked article to fill the voids left from the escaping volatile gases, and thus, densify the baked carbon body. Typically, impregnating pitches are solid at room temperature and must be preheated to a high temperature to transform them to a low viscosity liquid suitable for impregnation. It is also conventional to preheat the carbon body to an elevated temperature before adding the pitch impregnant.

The carbon body with pitch impregnant is then cooled to solidify the impregnant within the carbon body. After the pitch is impregnated into the carbon body, the carbon body with impregnant is normally rebaked to carbonize the impregnant. This process may be repeated several times so as to achieve the required density for the carbon article to be later graphitized.

The graphitization of the carbon bodies of the prior art include heat treatments of from about 2000° C. to about 3500° C. typically through use of an electric current. Most often the heat treatment process is on the order of days and converts the carbon body into a graphite material having an internal lattice-type structure.

As nuclear graphite necessitates extremely low levels of impurities within the graphite structure, notably with an ash amount less than about 300 parts per million (ppm) and a boron equivalence of less than 10.0 ppm, more typically less than 5.0 ppm, and commonly less than 2.0 ppm, the graphite is usually treated post-graphitization with a gas treatment at temperatures over about 2000° C. More specifically, the graphite undergoes treatment with a halogen gas at temperatures of from about 2200° C. to about 2600° C. to remove impurities so that the graphite does not exceed 300 parts per million ash or 2 parts per million boron equivalence. The boron equivalence of graphite, which is also referred to as "equivalent boron content", describes the neutron absorbing capacity of all the impurities, calculated from the type and amount of each impurity, and reported in terms of the neutron absorbing capacity of an equivalent amount of boron. Boron equivalence can be calculated using the method specified in ASTM C1233.

Furthermore, the necessity of post-graphitization purification to lower impurities so that the ash content is less than 300 ppm and the boron equivalence is less than 5.0 ppm is extremely expensive due to the high thermal energy expenditures needed for the purification. Yet furthermore, the extensive purification treatments may not be efficacious for the large graphite blocks required for some nuclear reactors.

What is desired, therefore, is a method for producing improved nuclear graphite (that is, graphite materials suitable for use in nuclear reactors) having isotropic properties, relatively high crystalline order, and impurity levels of ash less than about 300 ppm and boron equivalence less than about 5.0 ppm without the need for a post-graphitization purification process. Moreover, graphite articles are desired in which the articles can be made in relatively large blocks. Indeed, a combination of characteristics including isotropic properties, a relatively high degree of crystalline order, and impurities lower than achievable in the prior art without a separate purification step have been found to be desirable for the use of graphite in nuclear applications.

SUMMARY OF THE INVENTION

The present invention provides graphite suitable for nuclear applications with the improved characteristics of being isotropic, relatively crystalline, and not requiring a post-graphitization purification. The inventive graphite exhibits a combination of purity, crystallinity, and isotropy not heretofore seen. In addition, the specific process for producing the improved graphite from needle coke feedstock utilizes unique process conditions, and thus, provides a graphite with an ash content of less than about 300 ppm and a boron equivalent of less than about 5.0 ppm without the need for a post-graphitization purification step. More particularly, the inventive nuclear graphite has an isotropy ratio of from about 0.85 to about 1.5 measured by dividing the CTE in the against-grain direction by the CTE in the with-grain direction.

The inventive graphite for nuclear applications is created by a completely new approach to the production of large blocks of highly isotropic high-purity graphite. The novel process includes milling high-purity raw (i.e., not calcined) needle coke such as petroleum-derived needle coke into a fine powder, mixing the fine coke powder with binder pitch, subsequently milling the mixture into a molding powder, isostatically molding the powder into the desired shape of the graphite component, and thus, baking, densifying, and graphitizing the green article to produce a high-purity highly isotropic graphite. Indeed, the graphite produced in accordance with the inventive process can be characterized as near-isotropic, meaning it has an isotropy ratio of no greater than about 1.15, or even isotropic, meaning it has an isotropy ratio of no greater than about 1.10. Advantageously, the impurity levels of the graphite produced by the inventive process are so low that purification is not necessary, thereby achieving significant cost savings.

A further benefit of using a raw needle coke feedstock is that doing so results in a graphite with a higher degree of crystalline perfection as measured by x-ray diffraction and yet still remains relatively isotropic. If calcined needle coke was used, the crystalline perfection would be similar but the graphite would exhibit a greater preferred orientation or anisotropy in the formed article. High crystallinity is desirable for nuclear graphite because it is believed to "anneal out" irradiation damage better than graphite of low cystallinity. Isotropy is valued more than crystallinity in conventional nuclear graphites, so they are produced from high CTE isotropic cokes. The use of raw needle coke together with isostatic molding to further promote isotropy results in a combination of purity, crystalline order, and isotropy that is not possible in conventional processes.

An object of the invention, therefore, is graphite derived from needle coke possessing an ash content of less than about 300 parts per million and a boron equivalence of less than about 5.0 parts per million.

Another object of the invention is graphite having a high purity and improved isotropic properties wherein the isotropy ratio is of from about 0.85 to about 1.15, which enables the graphite to be employed for nuclear applications.

Still another object of the invention is the process for creating a high purity, relatively crystalline, isotropic graphite with a combination of characteristics which provide for improved graphite components for nuclear applications.

Yet another object of the invention is the process for creating high-purity highly isotropic graphite which includes the use of high purity raw needle coke milled to a specific size and subsequently processed to produce a high purity graphite which does not require a post-graphitization purification step.

These aspects and others that will become apparent to the artisan upon review of the following description can be accomplished by providing a high purity raw needle coke such as petroleum derived needle coke and milling the raw needle coke into a fine powder and subsequently combining the fine powder with binder pitch, milling the resulting mixture into a molding powder, isostatically molding the molding powder into a desired shape of the graphite component and further baking, densifying, and graphitizing the component to create a high purity near isotropic graphite. The resulting graphite has an isotropy ratio of from about 0.85 to about 1.5, more preferably an isotropy ratio of from about 0.85 to about 1.15, and most preferably from about 0.85 to about 1.10, and an ash content of less than about 300 ppm as well as a boron equivalence of less than about 5.0 ppm without undergoing a post-graphitization purification step.

The unique process for creating graphite suitable for nuclear applications creates graphite substantially free of impurities but still possessing improved isotropy as well as a controllable average density and flexural strength. Advantageously, the graphite produced from the novel process can be used for the new generation of nuclear fission high temperature and very high temperature reactors including both prismatic or pebble bed reactor designs.

It is to be understood that both the foregoing general description and the following detailed description provide embodiments of the invention and are intended to provide an overview of framework of understanding to nature and character of the invention as it is claimed.

DETAILED DESCRIPTION OF THE PREFERRED EMBODIMENTS

As noted above, the inventive graphite suitable for nuclear applications (herein referred to as nuclear graphite) is fabricated by first milling raw needle coke into a powder, combining the milled powder with pitch to form a mixture which is subsequently milled and processed to eventually form the nuclear graphite. More specifically, the needle coke is sized and milled such that 95% by weight is passes through a screen having mesh size of about 100 microns (referred to as particles "passing 100 microns"). More preferably, the particle size of the milled powder is passing about 75 microns, and most preferably passing about 44 microns (which is equivalent to a U.S. mesh size of 325). From a practical standpoint, the needle coke is milled to an average diameter which is at least about 2 microns. The particle size of the milled needle coke is selected according to certain desired physical properties of the graphite, such as flexural strength, density, electrical resistance, thermal conductivity, etc. and is within the skill of the art.

The inventive process includes the use of high-purity raw-needle coke preferably from petroleum for the basic carbon constituent of the nuclear graphite, although coal-based needle cokes, as well as needles cokes from other sources, can also be employed. The specific properties of the needle coke are dictated through the control properties of the coking process in which an appropriate carbon feedstock is converted into the needle coke. Typically, needle coke can be defined as having a characteristic CTE less than 0.4 ppm/° C. measured between 30° C. and 100° C. An advantage of using raw needle coke instead of high CTE calcined coke is that the petroleum based feedstock for producing needle coke is relatively free from ash as ash constituents will preclude the formation of needle coke during the coking process. Generally, the production of high purity raw needle coke necessitates low levels of impurities within the starting feedstock for the proper mesophase formation during the coking process whereas substantial levels of impurities do not impede the formation of a high CTE calcined coke. Needle coke gives the further advantage of producing a graphite with relatively high crystalline order. By using raw needle coke instead of calcined needle coke the graphite can be made more isotropic.

The milling of the raw needle coke is useful to provide coke particles with minimal graphitic crystal orientation so as to preclude an anisotropic characteristic in the nuclear graphite. This is because calcining produces cracks along optical domain boundaries which cleave when the coke is milled, thus accentuating the preferred orientation of crystallinity within each particle. The raw needle coke does not contain the oriented cracks and therefore cleaves into less oriented particles.

The powdered needle coke is then mixed with pitch, such as a coal tar binder pitch, which has been preheated to convert the pitch to a low viscosity liquid suitable for creating a homogeneous mixture of pitch and powdered coke. In a further embodiment, the coke will also be preheated to an elevated temperature before adding the pitch so as to improve the homogeneity of the resulting mixture, which is considered a needle coke and pitch mixture. Typically the mixture of pitch and needle coke contains between about 20 parts binder pitch per hundred parts coke and about 80 parts binder pitch per hundred parts coke, and preferably between about 40 and about 70 parts binder pitch per hundred parts coke.

The needle coke and pitch mixture is typically milled into a molding powder for the subsequent isostatic molding process. Generally the mixture is milled to a particle size of passing about 150 microns, more preferably passing about 100 microns, and most preferably about 75 microns for the molding powder. By milling the needle coke to a fine size relative to the molding powder, the anisotropic properties of the needle coke are further compensated for, resulting in a high purity molding powder with little anisotropy.

Baking the needle coke and pitch mixture prior to milling is not required, as it is in other nuclear graphite production processes capable of producing isotropic graphite from needle coke, such as the process referred to in the art as BAN processing and generally described in British Patent No. 1,098,882, providing another cost and time savings in the inventive process.

The molding powder is then formed into a large block shape through isostatic molding as is discussed in U.S. Pat. No. 5,107,437, the disclosure of which is herein incorporated by reference. Isostatic molding is a pressing process for densifying a powdered composition into a compact shape at pressures sufficient to obtain near theoretical density. The molding powder is densified under pressure acting through a suitable fluid medium, preferably a liquid, to achieve an omnidirectional high green density. Neither extrusion, uniaxial molding or vibrational molding are suitable for forming nuclear graphite as extrusion, uniaxial molding and vibrational molding all produce a product having an orientation of particles following the shape of the formed product. This orientation can result in a graphite product with marked anisotropy which is completely unsuitable for nuclear applications.

In the isostatic molding of the molding powder formed of needle coke powder and pitch, the composition is pressed into a densified compact shape within a conventional elastomeric mold or design bag. The isostatic mold is then sealed to prevent the ingress of isostatic fluid and subsequently loaded into a supporting structure to form a mold assembly. This loaded mold assembly is placed within a pressure vessel, wherein the vessel is subsequently filled with an isostatic fluid and sealed. Typically, an isostatic molding pressurization pump is activated to raise the pressure in a controlled rate so that the density of the resulting green article of powdered needle coke and pitch reaches a desired density point. Once the density of the mixture within the isostatic mold is achieved, the system is depressurized and the novel green article is removed. Typically this density mirrors the final density of the graphite product generally being of from about 1.2 g/cc to about 1.8 g/cc. By isostatically molding the molding powder into a green article rather than by using conventional extrusion or uniaxial molding of a hot mix, any tendency during the formation to favor a latent preferred orientation is substantially reduced.

After the isostatic molding, the molded green article is heat treated by baking at a temperature of from about 700° C. to about 1100° C. and more preferably between about 800° C. and about 1000° C. so as to carbonize the pitch binder to solid coke to create a carbonaceous article which has a permanency of form, high mechanical strength, good thermal conductivity and comparatively low electrical resistance. Most often, the novel green article is baked in the relative absence of air to avoid oxidation with the temperature increased at a rate of about 1° C. to about 5° C. per hour until the final temperature is achieved. After baking, the carbonaceous article may be impregnated one or more times with pitch to deposit additional pitch coke in any open pores of the article. Preferably, the article is only impregnated one additional time with a pitch material. After baking, the article referred to at this stage as a carbonized nuclear graphite precursor is then graphitized.

Graphitization is by heat treatment at a final temperature of between about 2500° C. to about 3400° C. for a time sufficient to cause the carbon atoms in the carbonized nuclear graphite precursor to transform from a poorly ordered state into the crystalline structure of graphite. Advantageously, graphitization is performed by maintaining the carbonized nuclear graphite precursor at a temperature of at least about 2700° C., and more advantageously, at a temperature of between about 2700° C. and about 3200° C. At these high temperatures, some of the existing elements other than carbon are volatilized and escape as vapors. The time required for maintenance at the graphitization temperature using the process of the present invention is less than about 12 hours.

Once graphitization is completed, the finished nuclear graphite can be cut to size, machined, otherwise formed or left in its original configuration. Furthermore, post-graphitization purification is not needed as the ash content is less than about 300 parts per million and also the boron equivalent is less than about 2.0 parts per million.

The nuclear graphite prepared in accordance with the present invention exhibits isotropy with the isotropy ratio from about 0.85 to about 1.5, preferably of from about 0.85 to about 1.15, and most preferably from about 0.85 to about 1.1, with the CTE with the grain of the nuclear graphite being from about 3 ppm/° C. to about 6 ppm/° C. and with the CTE against the grain of the nuclear graphite being of from about 3 ppm/° C. to about 6 ppm/° C. measured between 30° C. and 100° C. The inventive graphite can be examined optically, and exhibits individual large domains about equal to the coke particle size which can be measured as, on average, less than about 100 microns, more preferably less than 75 microns, and most preferably less than about 44 microns. Contrariwise, when nuclear graphite is produced from high CTE isotropic cokes the optical domain size is much smaller than the particle size and tends to be about 5 to 25 microns on average.

Furthermore, by varying the size of the powdered needle coke of from about 2 microns to passing about 75 microns, one can create a nuclear graphite with the desired flexural strength, density, and thermal conductivity to fit a specific nuclear application.

Yet furthermore, the produced nuclear graphite will have an average density of from about 1.5 g/cc to about 1.8 g/cc. The flexural strength of the novel graphite is typically from about 25 MPa to about 40 MPa while still having a thermal conductivity of greater than about 85 W/m-K, and preferably greater than about 120 W/m-K. The above characteristics combined with the low levels of ash and boron equivalence provide an improved graphite ideally suited for nuclear applications.

The following example is presented to further illustrate and explain the present invention and should not be viewed as limited in any regard. Unless otherwise indicated, all parts and percentages are by weight and are based on the weight of the product at the particular stage in processing indicated.

A raw needle coke is milled to an average particle size of 25 microns and mixed with 60 parts coal tar binder pitch per hundred parts coke at about 160° C. The mixture of needle coke and coal tar binder pitch is milled to an average size of 35 microns and subsequently isostatically molded. The resulting molded green article is baked at a temperature of about 800° C. and subsequently densified to create a nuclear graphite precursor. The precursor is then graphitized at to over 3000° C. to produce the novel nuclear graphite. The novel nuclear graphite has an ash content of less than about 300 ppm and also has a boron equivalence of less than about 2.0 ppm. Furthermore the isotropy ratio of the nuclear graphite is less than about 1.4 with a flexural strength of over 25 Mpa and a thermal conductivity of about 130 W/m-K making the graphite suitable for nuclear applications without a post graphitization purification step.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims. The claims are intended to cover the indicated elements and steps of any arrangement or sequence that is effective to meet the objectives intended of the invention unless the context specifically indicate the contrary.

What is claimed is:

1. A method of producing a graphite article comprising:
    a. mixing raw needle coke having a coefficient of thermal expansion less than 0.4 ppm/° C. measured between 30° C. and 100° C. and which has been milled such that 95% by weight passes through a screen having mesh size of about 100 microns with binder pitch to form a coke mixture;
    b. milling the coke mixture to create a molding powder such that 95% by weight passes through a screen having mesh size of about 150 microns;
    c. isostatically molding the molding powder to form a green article; and
    d. graphitizing the processed carbonaceous article to obtain a graphite article having an isotropy ratio of no greater than about 1.5, where isotropy ratio is defined as the ratio of coefficient of thermal expansion in two directions, with less than about 300 parts per million ash and less than about 2 parts per million boron equivalence without a post-graphite purification treatment.

2. The method of claim 1 wherein the needle coke is petroleum coke.

3. The method of claim 1 wherein the powdered needle coke has a particle size of passing about 75 microns.

4. The method of claim 3 wherein about 95% of the powered needle coke has a particle size of passing about 44 microns.

5. The method of claim 1 wherein the molding powder of step b) has an average particle size of passing about 100 microns.

6. The method of claim 1 wherein the graphite article has an average density of from about 1.5 g/cc to about 1.8 g/cc.

7. The method of claim 1 wherein the graphite article has a flexural strength of from about 25 MPa to about 40 MPa.

8. The method of claim 1 wherein the graphite article has a thermal conductivity greater than about 85 W/mK.

9. The method of claim 1 wherein the graphite article has an isotropy ratio of less than about 1.15.

10. The method of claim 1 wherein the graphite article has a coefficient of thermal expansion of from about 3 ppm/° C. to about 6 ppm/° C. at temperatures of from 30° C. to 100° C.

* * * * *